United States Patent [19]

Acker et al.

[11] 4,153,555
[45] * May 8, 1979

[54] CRYOGENIC BEACH CLEANER

[76] Inventors: Jan R. Acker, 4402 Dwight Dr.;
Norman R. Braton, 457 Agnes Dr.;
James A. Koutsky, 3116 Gregory St.;
Robert F. Wendt, 2649 Mason St., all
of Madison, Wis. 53711

[*] Notice: The portion of the term of this patent subsequent to Aug. 23, 1994, has been disclaimed.

[21] Appl. No.: 753,553

[22] Filed: Dec. 22, 1976

[51] Int. Cl.² ........................ B01D 17/00; F25C 1/00
[52] U.S. Cl. .................................. 210/198 R; 62/66;
62/533; 210/241
[58] Field of Search .................... 210/65, 71, 36, 175,
210/177, 179, 198 R, 242 O, 242 AS, DIG. 26
P, 241, 502; 62/66, 533; 61/36 A

[56] References Cited
U.S. PATENT DOCUMENTS

| | | | |
|---|---|---|---|
| 3,614,873 | 10/1971 | Cole et al. | 210/DIG. 26 P |
| 3,800,950 | 4/1974 | Hess et al. | 210/DIG. 26 P |
| 3,888,766 | 6/1975 | De Young | 210/DIG. 26 P |
| 3,962,083 | 6/1976 | Goldman | 210/242 AS |
| 4,043,140 | 8/1977 | Wendt et al. | 210/242 R |

Primary Examiner—Frank Sever
Attorney, Agent, or Firm—Gerald S. Geren

[57] ABSTRACT

An improved method and apparatus are disclosed herein for cryogenically cleaning and restoring sandy beaches which have become contaminated by oil spills. In the method, a mixture of particulate, pulverized and recycled rubber and wood fines is applied to the contaminated area for absorbing the oil prior to cryogenic treatment. The absorption of the oil by the particulate rubber and wood enhances the solidification during the cryogenic treatment. In the apparatus, a hopper is mounted to a beach cleaning vehicle forwardly of a liquid cryogen spray head. The hopper is constructed to receive and discharge particulate absorbent before the contaminated area is contacted by the liquid cryogen.

3 Claims, 2 Drawing Figures

CRYOGENIC BEACH CLEANER

FIELD OF THE INVENTION

This invention relates to an improved method and machine for cleaning sandy beaches which have been contaminated by an oil spill and, more particularly, to the use of a particulate absorbent to enhance the cleaning operations.

BACKGROUND OF THE INVENTION

Prior art devices have been provided to remove oil contaminated areas from sandy beaches. In one particular method, liquid nitrogen was sprayed onto the contaminated area so as to solidify the oil and sand into a mixture that is to be separated from the clean, underlying sand.

This method was implemented with a cryogenic spray head for spraying the contaminated area, and shovel means for separating the solidified mixture from the underlying sand. Conveyors transported the separated mixture to trailers or trucks which delivered it to treatment or disposal sites.

Although this method represented a significant advance, some situations arose where complete solidification was hard to achieve when the oil viscosity was low. Sometimes even when the solidification of oil was achieved, a residue remained in the sand. Finally, depending upon the conditions, the period in which the mixture remained solidified was fairly short and it was difficult to complete separation, transportation and delivery within that short time.

It is therefore an object of this invention to provide an improved method and machine for restoring sandy beaches which have become contaminated by an oil spill;

It is a further object of this invention to lengthen the solidification period;

It is another object of this invention to minimize the amount of residue remaining after treatment; and These and other objects of this invention will become apparent from the following description and appended claims.

BRIEF SUMMARY OF THE INVENTION

This invention provides an improved method and machine for effectively and efficiently removing an oil spill from a sandy beach and transporting the contaminated oil and sand mixture to a disposal or treatment site. The method and machine eliminate the difficulties previously encountered by applying an absorbent material to the contaminated area prior to spraying with a cryogen.

The improved method of this invention includes releasing an oil absorbent particulate, such as a rubber and wood fine mixture, onto the contaminated area to absorb the oil, and then spraying a liquid cryogen onto the contaminated area to solidify the oil, sand and absorbent particulate.

The improved cryogenic beach-cleaning vehicle includes a hopper positioned forwardly of the cryogenic spray head for storing and discharging the absorbent particulate. The remainder of the vehicle includes a spray head for spraying the liquid cryogen on the contaminated area, means for separating the solidified mixture from the underlying sand and conveyor means for delivering the separated mixture to trailers or trucks.

The rubber and wood mixture has favorable absorption characteristics. And by using recycled, pulverized rubber particulate, an absorbent particulate is obtained which is inexpensive, is in ready supply from waste rubber, significantly increases the viscosity of the oil, rapidly absorbs (within 15-30 seconds) the oil due to the similarity in organics between the oil and the carbon black in the rubber and significantly increases the length of time of solidification.

DESCRIPTION OF THE PREFERRED EMBODIMENT

Figure 1:
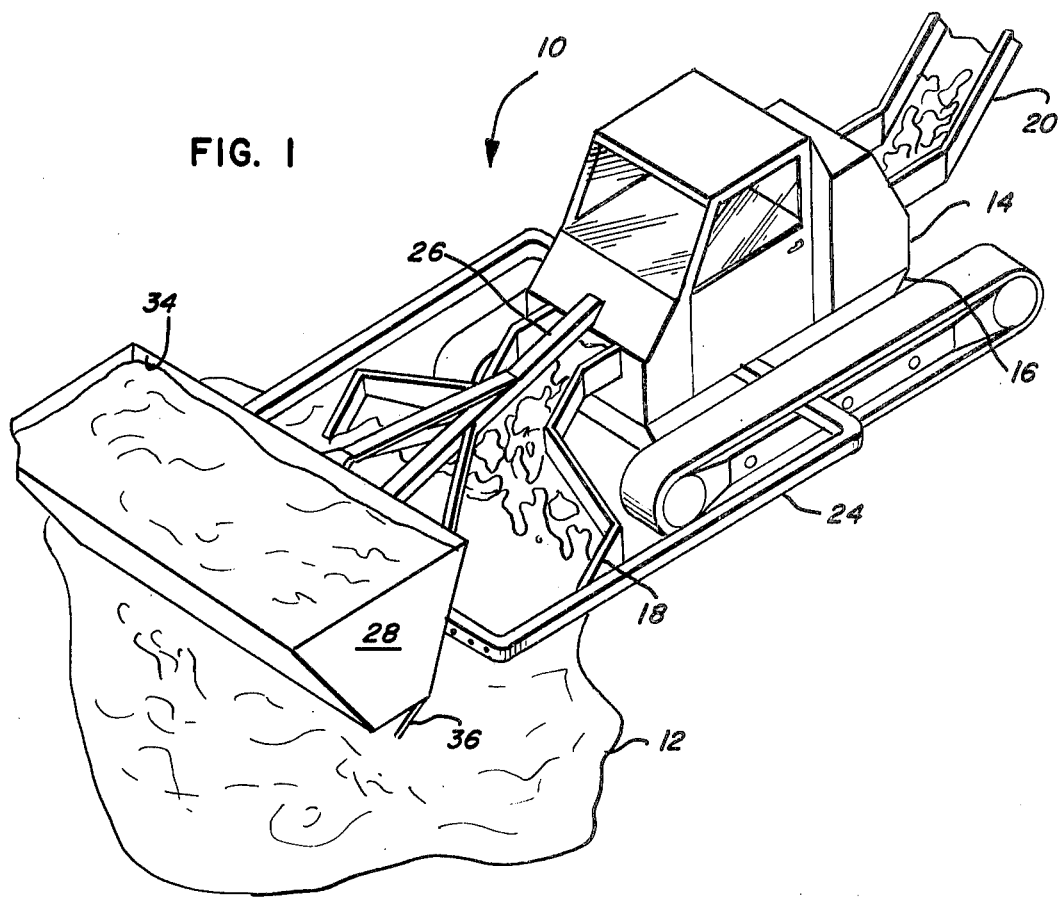
FIG. 1 is a perspective view of a cryogenic beach-cleaning vehicle made in accordance with the present invention.
Figure 2:
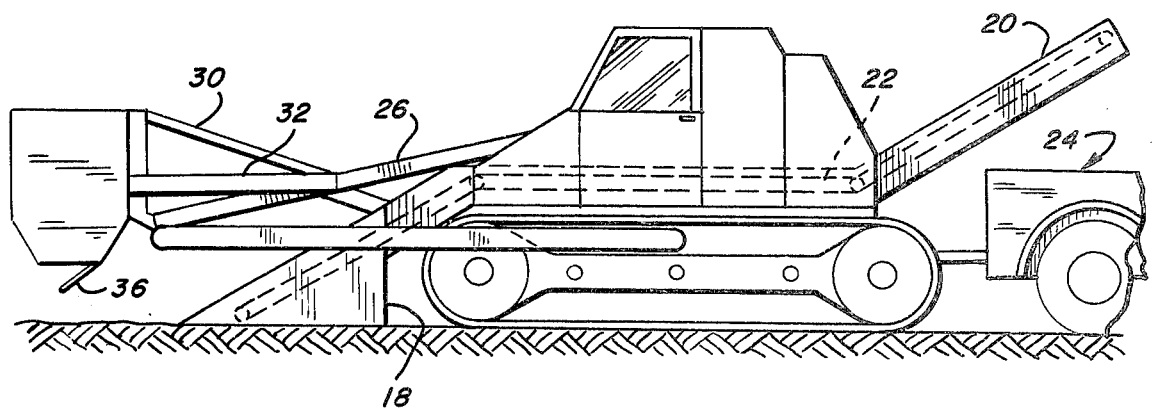
FIG. 2 is a side view of the beach-cleaning vehicle and showing a portion of a trailer hitched to the rear end of the cleaner.

Referring now to the drawings, a cryogenic beach-cleaning vehicle 10 is shown moving toward an area 12 of a sandy beach which has been contaminated by an oil spill. The beach cleaner is a tracked vehicle including: a body portion 14; a liquid cryogen reservoir 16; a shovel means 18 mounted at the front end of the body; a discharge chute 20 at the rearward end of the body; and a conveyor means 22 extending between the shovel means and discharge chute. A liquid cryogen spray head 24 is mounted to the body by a boom 26 and is arranged to extend forwardly of the shovel means 18. Liquid cryogen is sprayed from the forward end of the spray head 24 in an advance or leading relationship to the boom 26.

Liquid nitrogen is the preferred liquid cryogen since it is available in large commercial quantities, and after spraying, it merely evaporates into the atmosphere with no ecological damage. However, it will be appreciated that other gases which are liquid at temperatures under $-100$ degrees C. can be used.

A hopper 28 is positioned forwardly of the liquid cryogen spray head 24 and is secured to the boom 26 by additional supporting struts, such as 30 and 32. The hopper has an open-top storage compartment 34 and a lower plate 36 hingedly connected to the hopper 28 for governing release of materials from the storage compartment 34.

The boom 26 supports both the hopper 28 and the spray head 24. By interconnecting the boom with the spray head and hopper, the boom can be raised and lowered simultaneously. In this manner the hopper is always in a leading relationship to the spray head 24.

An oil absorbent mixture is stored within and is discharged from the hopper. The mixture is of pulverized and recycled rubber and wood fines. Pulverized and recycled rubber is an advantageous absorbing compound. It is inexpensive and can be obtained from waste materials, such as scrap automobile tires. Furthermore, it floats on the surface while rapidly absorbing oil. The use of the rubber particles can be quite flexible since they can be: (1) placed directly on the oil surface; (2) incorporated in a flexible, floatable, porous containers which are placed on the oil surface; or (3) mixed with other absorbents, such as wood fines, to increase the viscosity of the oil absorbed.

No special chemical treatment of the rubber particles is necessary. The pulverization, however, is essential to achieve as rapid absorption as possible. Particles larger than 20 mesh are not useful because they absorb oil too slowly and the larger particles are apt to have fibrous material, steel wire, or other fillers therein.

The wood fines should be a 30–50 mesh size. And since wood fines are a waste product from paper mills, they are cheap and readily available.

Experimentation has shown that a mixture of 50% by weight of wood fines and 50% by weight of the pulverized, recycled rubber is particularly useful for oil absorption and that the mixture should always contain at least 50% rubber.

In operation, as the vehicle moves forwardly into the contaminated area 12, the mixture of pulverized, recycled rubber and wood fines is discharged at a rate determined by the vehicle operator and the liquid nitrogen or other liquid cryogen is sprayed onto the contaminated area. The mixture absorbs oil and the liquid cryogen causes the oil, sand, pulverized, recycled rubber and wood fines in the contaminated area to solidify. The shovel is able to easily separate and lift the solidified mixture from the uncontaminated dry sand. The solidified mixture is then directed onto the conveyor and out the discharge end into a trailer, where it is transported to a separation point. At the separation point, the oil is separated from the mixture and the oil returned to a refinery for further processing and the sand is returned to the beach for restoration of the beach.

Controls for the vehicle, the raising and lowering of the boom, the conveyor, the hinged hopper plate, etc., are all provided for the operator within the cab. Standard control mechanisms and linkages are employed, which are well known in the art.

It will be appreciated that numerous changes and modifications can be made to this apparatus without departing from the spirit and scope of the invention.

What is claimed and desired to be secured by Letters Patent of the United States is:

1. An improved cryogenic beach-cleaning machine for cleaning a sandy beach which has been contaminated by oil from an oil spill mixing with the beach sand, said machine including: means for moving said machine along said beach; means for contacting the contaminated area immediately forward of said machine with a liquid cryogen so as to cause solidification and permit subsequent separation and removal; and means for separating said solidified material from the beach, said separation apparatus being positioned in trailing relation to said contacting means; the improvement comprising in combination:

hopper means carried by said machine and positionable forwardly of and in leading relation to said liquid cryogen contacting means, said hopper means having storage means to receive particulate absorbent and means for controllably discharging said absorbent onto a contaminated area prior to the area being contacted by the liquid nitrogen.

2. The cryogenic beach-cleaning machine of claim 1, including a boom connected at one end to the cleaning machine and at the second end to the hopper means and the liquid cryogen contacting means whereby raising or lowering of the hopper means also raises and lowers the contacting means.

3. The cryogenic beach-cleaning machine of claim 1, wherein the storage means has a hinged lower plate governing discharge of the absorbent.

* * * * *